United States Patent [19]
You et al.

[11] Patent Number: 6,122,423
[45] Date of Patent: Sep. 19, 2000

[54] PIGTAILING METHOD BETWEEN OPTICAL WAVEGUIDE DEVICE AND OPTICAL FIBER ARRAY

[75] Inventors: Byong-gwon You, Sansung-dong; Tae-hyung Rhee, Sungnam; Hyung-jae Lee, Yongin, all of Rep. of Korea

[73] Assignee: SamSung Electronics Co., Ltd., Suwon, Rep. of Korea

[21] Appl. No.: 09/206,248

[22] Filed: Dec. 7, 1998

[30] Foreign Application Priority Data

Dec. 8, 1997 [KR] Rep. of Korea ............... 97-66779

[51] Int. Cl.[7] .................................................. G02B 6/30
[52] U.S. Cl. .............................. 385/49; 385/39; 385/50
[58] Field of Search ................................. 385/49, 31, 32, 385/39, 50, 132

[56] References Cited

U.S. PATENT DOCUMENTS

| | | | |
|---|---|---|---|
| 4,111,520 | 9/1978 | Bernal | 385/132 |
| 5,652,814 | 7/1997 | Pan et al. | 385/24 |
| 5,970,192 | 10/1999 | Osugi et al. | 385/49 |

FOREIGN PATENT DOCUMENTS

| | | |
|---|---|---|
| 5-224036 | 9/1993 | Japan . |
| 6-281825 | 10/1994 | Japan . |
| 10-123373 | 5/1998 | Japan . |
| 10-227934 | 8/1998 | Japan . |

*Primary Examiner*—John D. Lee
*Assistant Examiner*—Sarah N Song
*Attorney, Agent, or Firm*—Robert E. Bushnell, Esq.

[57] ABSTRACT

The present invention includes a pigtailing method between an optical waveguide device and an optical fiber array module, comprising the steps of preparing the optical waveguide device having optical waveguides of n1 input ports and n2 output ports on the lateral surface of a substrate, wherein n1 and n2 are integers equal to or greater than 1, aligning the optical fiber array module having optical fibers arranged at equal distances between the input ports and between the output ports, to the input and output ports of the optical waveguide device, and attaching the aligned optical fiber array module to the lateral surface of the optical waveguide device. Since only one attachment process of the optical fiber array module to the optical waveguide device is required, the fabrication cost can be reduced.

18 Claims, 1 Drawing Sheet

PIGTAILING METHOD BETWEEN OPTICAL WAVEGUIDE DEVICE AND OPTICAL FIBER ARRAY

CLAIM OF PRIORITY

This application makes reference to, incorporates the same herein, and claims all benefits accruing under 35 U.S.C. §119 from an application for PIGTAILING METHOD BETWEEN OPTICAL WAVEGUIDE DEVICE AND OPTICAL FIBER ARRAY earlier filed in the Korean Industrial Property Office on Dec. 8, 1997 and there duly assigned Serial No. 66779/1997.

BACKGROUND OF THE INVENTION

1. Field of the Invention

The present invention relates to optical waveguide devices, and more particularly, to a pigtailing method between an optical waveguide device and an optical fiber array module.

2. Description of the Related Art

In general, optical waveguide devices are fabricated on a planar substrate using planar waveguide technology. The optical waveguide devices include an optical splitter, an optical coupler, an optical modulator, an optical switching element, an optical signal multiplexer, an equalizer and the like. In an effort to apply the optical waveguide devices to an optical communications system, various techniques have been studied, which may be generally divided into the fields of waveguide design, waveguide fabrication, waveguide packaging and environmental characteristic measurement of a waveguide device.

Among these techniques, waveguide packaging is an essential technique for allowing an optical waveguide device to take full advantage of its optical properties after it is fabricated. Particularly, a pigtailing process, that is a connecting process, between the optical waveguide device and an optical fiber array module is very important for enhancement of optical properties of the optical waveguide device.

A conventional pigtailing method uses an optical waveguide device having an optical waveguide formed on a substrate and which includes an input port and an output port on different surfaces of the device. A first optical fiber array module having a first optical fiber arranged on the module is attached to the input port and a second optical fiber array module having a second optical fiber arranged on the second module is attached to the output port. In the conventional pigtailing method between the optical waveguide device and the optical fiber array modules, the input port of the optical waveguide device and the first optical fiber array module are aligned and the first optical fiber array module is attached to the input port when the output level of the output port is highest. Then the output port of the optical waveguide device and the second optical fiber array module are aligned to then be attached to each other.

However, according to the above-described conventional pigtailing method between the optical waveguide device and the optical fiber array modules, since the input port and output port of the optical waveguide device exist on different planes, that is, on different surfaces of the substrate, the optical fiber array modules must be separately attached to the two planes. Thus, in the pigtailing process between an optical waveguide device and an optical fiber, the step necessary for attachment of an optical fiber array module must be repeated for an input port and an output port, thus being performed twice overall. As a result, the conventional pigtailing method between an optical waveguide device and an optical fiber involves considerable cost.

Based on my observation of the art, then, I have discovered that what is needed is an improved pigtailing method. Specifically, a method is needed in which the optical waveguide device and the optical fiber array are coupled in a single step.

SUMMARY OF THE INVENTION

It is therefore an object of the present invention to provide a improved method for pigtailing an optical fiber array module to an optical waveguide device.

It is a further object of the present invention to provide a method for pigtailing an optical fiber array module to an optical waveguide which is simpler than conventional methods.

It is a still further object to provide a method for pigtailing an optical fiber array module to an optical waveguide which requires a single alignment and attachment step.

It is yet a further object to provide a method for pigtailing which has a lower cost.

Accordingly, to achieve the above objects, there is provided a pigtailing method between an optical waveguide device and an optical fiber array module, comprising the steps of preparing the optical waveguide device having optical waveguides of n1 input ports and n2 output ports on the lateral surface of a substrate, wherein n1 and n2 are integers equal to or greater than 1, aligning the optical fiber array module having optical fibers arranged at equal distances between the input ports and between the output ports, to the input and output ports of the optical waveguide device, and attaching the aligned optical fiber array module to the lateral surface of the optical waveguide device.

The optical waveguide of the optical waveguide device is formed on the surface of the substrate, and is comprised of a crosswise, or vertical, traveling region perpendicular to the lateral surface of the substrate and a lengthwise, or horizontal, traveling region parallel to the lateral surface. Preferably, the center-to-center distance between the optical waveguides in the horizontal traveling region is in the range of approximately 5–1000 $\mu$m.

The optical waveguides connected to the input and output ports include at least one arc having a radius of curvature for positioning the input and output ports on one lateral surface of the optical waveguide device. Here, at least two of the radii of curvature of the arcs of the optical waveguides connected to the input and output ports may be the same, or the radii of curvature of the arcs of the optical waveguides connected to the input and output ports may be different from one another.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE DRAWINGS

Figure 1:
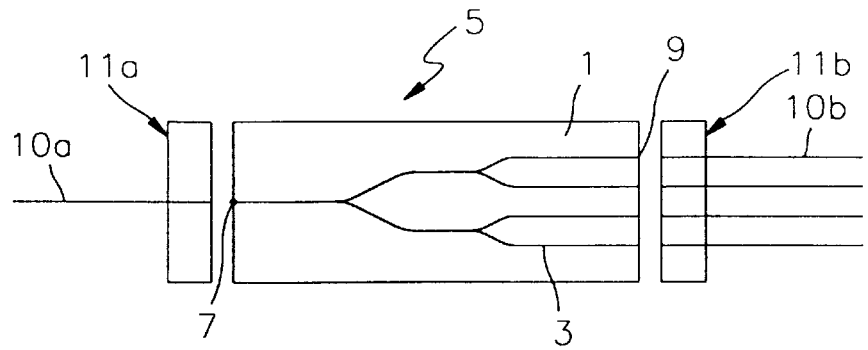
FIG. 1 is a plan view illustrating a conventional pigtailing method between an optical waveguide device and an optical fiber array module.

Turning to the figures, FIG. 1 is a plan view showing a conventional pigtailing method between an optical waveguide device and an optical fiber array module. Referring to FIG. 1, optical waveguide device 5 having optical waveguide 3 formed on substrate 1 includes input port 7 and output port 9. First optical fiber array module 11a having first optical fiber 10a arranged thereon and second optical fiber array module 11b having second optical fiber 10b arranged thereon are attached to input port 7 and output port 9, respectively. The conventional pigtailing method between optical waveguide device 5 and the optical fiber array modules is performed such that input port 7 of optical waveguide device 5 and first optical fiber array module 11a are aligned, first optical fiber array module 11a is attached to input port 7 when the output level of output port 9 is highest, and then output port 9 of optical waveguide device 5 and second optical fiber array module 11b are aligned to then be attached to each other.

However, according to the above-described conventional pigtailing method between optical waveguide device 5 and the optical fiber array modules 11a and 11b, since input port 7 and output port 9 of optical waveguide device 5 exist on different planes, that is, different surfaces of substrate 1, optical fiber array modules 11a and 11b must be separately attached to the two planes. Thus, in the pigtailing process between an optical waveguide device and an optical fiber, the step necessary for attachment of an optical fiber array module must be repeated for an input port and an output port, being performed twice overall. As a result, the conventional pigtailing method between an optical waveguide device and an optical fiber involves considerable cost.

Figure 2:
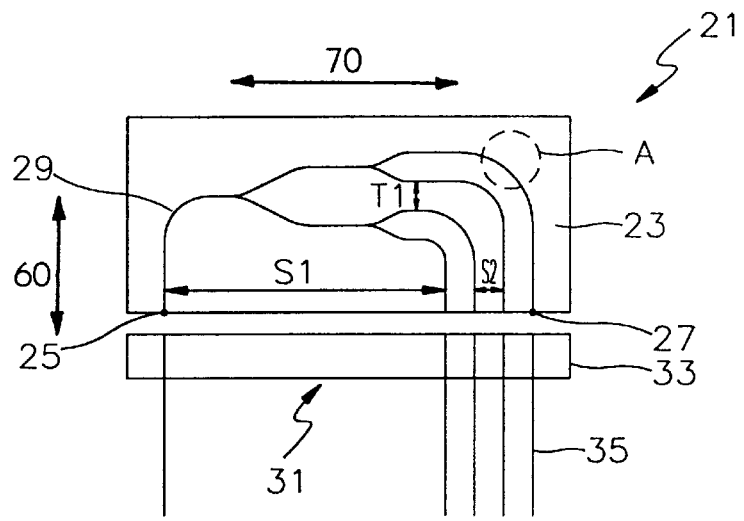
FIG. 2 is a plan view illustrating a pigtailing method between an optical waveguide device and an optical fiber array module according to the present invention.
Figure 3:
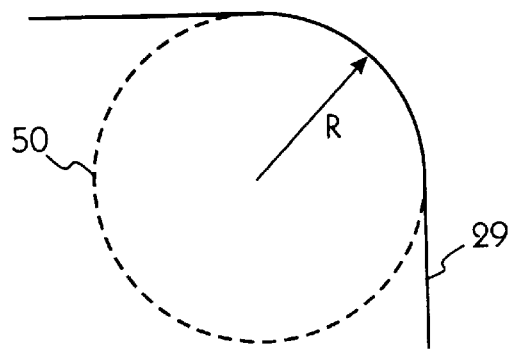
FIG. 3 is an enlarged view of a portion "A" of FIG. 2, illustrating the shape of an optical waveguide.

Turning now to the present invention, FIG. 2 is a plan view illustrating a pigtailing method between an optical waveguide device and an optical fiber array module according to the present invention, and FIG. 3 is an enlarged view of a portion "A" of FIG. 2. Referring to FIGS. 2 and 3, in a pigtailing method between optical waveguide device 21 and optical fiber array module 31 according to the present invention, optical waveguide device 21 has optical waveguide 29 having n1 (n1 is an integer of equal to or greater than 1) input port(s) 25 and n2 (n2 is an integer of equal to or greater than 1) output port(s) 27 on a lateral surface of substrate 23, e.g., a LiNbO$_3$ substrate, a silicon wafer, a Si$_3$N$_4$ substrate, silica glass or a Group III-V semiconductor substrate (e.g., GaAs). Particularly, optical waveguide device 21 according to the embodiment of the present invention illustrated in FIG. 2, corresponds to a 1×4 optical splitter having one input port 25 and four output ports 27. Although an optical splitter is used as an optical waveguide device in this embodiment, an optical coupler, an optical modulator, an optical switching element, an optical signal multiplexer or an equalizer can be used. Also, optical waveguide 29 is comprised of a crosswise, or vertical, traveling region in which the waveguide runs perpendicular to the lateral surface of substrate 23 in the direction indicated by arrow 60, and a lengthwise, or horizontal, traveling region in which the waveguide runs parallel to the lateral surface in the direction indicated by arrow 70. Particularly, optical waveguide 29 connected to input port 25 and output ports 27 includes at least one arc having a radius of curvature R as shown in FIG. 3. In FIG. 3, R is the radius of imaginary circle 50 along which the arc section of waveguide 29 lies. Radius of curvature R has a value exceeding 100 $\mu$m, to allow input port 25 and output ports 27 to be positioned on one section. Here, the radii of curvature of the arcs of optical waveguide 29 where connected to input port 25 and output ports 27 may be made such that at least two of them are the same or such that all of them are different from one another.

In FIG. 2, S1 is the center-to-center distance between input port 25 and output port 27, and S2 is the center-to-center distance between neighboring output ports 27. S1 and S2 are greater than or equal to 125 $\mu$m, preferably 125–1000 $\mu$m. Also, T1 is the center-to-center distance between optical waveguides split from optical waveguide 29 and traveling in the horizontal traveling region, and is made to be in the range of approximately 5–1000 $\mu$m. In this embodiment, optical waveguide device 21 is provided with one input port 25. However, if optical waveguide device 29 has n1 input ports, with n1 greater than 1, the center-to-center distance between the ports is made to be approximately 125 $\mu$m or greater, preferably in the range of approximately 125–1000 $\mu$m, as in the output ports. Also, in this embodiment, the input port(s) and the output port(s) can be switched.

Next, optical fiber array module 31 has optical fibers 35 arranged on substrate 33 at equal distances to those between input port 25 and between output ports 27 of the optical waveguide device 21. Thus, when optical fiber array module 31 is attached to optical waveguide device 21 having input port 25 and four output ports 27, optical fiber array module 31 having optical fibers 35 arranged thereon is aligned in conformity with the positions of input and output ports 25 and 27 of optical waveguide device 21, as shown in FIG. 2. Subsequently, aligned optical fiber array module 31 is attached to the lateral surface of optical waveguide device 21. As a result, according to the present invention, since input and output ports of an optical waveguide device are formed at the lateral surface thereof, the pigtailing process between the optical waveguide device and an optical fiber array module can be completed by performing the steps necessary for attachment of an optical fiber array module once, unlike the conventional process in which the steps for attachment of an optical fiber array module must be repeated separately for the input and output ports, respectively.

As described above, in the pigtailing method between an optical waveguide device and an optical fiber array module according to the present invention, the process necessary for attachment of the optical fiber array module to the optical waveguide device can be simplified, thereby reducing the fabrication cost.

Although the present invention has been described and illustrated in detail, the invention is not limited thereto, it is clearly understood that various modifications and alterations can be readily made by those skilled in the art within the scope and spirit of the invention.

What is claimed is:

1. A method of pigtailing an optical waveguide device, comprising the steps of:
   preparing an optical waveguide device comprising:
   a substrate having a lateral surface and a top surface;
   an optical waveguide formed on said top surface, whose shape comprises:
      an input port terminating at said lateral surface;
      a crosswise portion extending from said input port perpendicular to said lateral surface;
      a first arc portion extending from said crosswise portion;
      a first lengthwise portion extending from said arc portion and running parallel to said lateral surface;
      a branch splitting said first lengthwise portion;

a plurality of second lengthwise portions extending from the branch and running parallel to said lateral surface;

a second arc portion extending from one of the second lengthwise portions; and a second crosswise portion extending from said second arc portion perpendicular to said lateral surface, and terminating at an output port on said lateral surface;

preparing an optical fiber array module whose optical fibers terminate on one surface of the optical fiber array module and are arranged to align with said input and output ports of said optical waveguide device when said lateral surface of the optical waveguide device is aligned with said one surface of said optical fiber array module;

aligning said lateral surface of said optical waveguide device with said one surface of said optical fiber array module; and attaching said lateral surface of said optical waveguide device with said one surface of said optical fiber array module.

2. The method of claim 1, further comprising said optical waveguide device having a plurality of input ports.

3. The method of claim 1, further comprising said optical waveguide device having a plurality of output ports.

4. The method of claim 1, where said optical waveguide device is a device selected from the group consisting of an optical splitter, and optical coupler, an optical modulator, an optical switching element, an optical signal multiplexer and an equalizer.

5. The method of claim 1, further comprising:

the center to center distance between neighboring second lengthwise portions being in the range of approximately 5 to 1000 $\mu$m.

6. The method of claim 1, where said optical waveguide device further comprises a plurality of input ports, where the center to center distance between said input ports is greater than approximately 125 $\mu$m.

7. The method of claim 1, where said optical waveguide device further comprises:

a plurality of input ports, where the center to center distance between said input ports is in the range of approximately 125 to 1000 $\mu$m.

8. The method of claim 1, where said optical waveguide device further comprises:

a plurality of output ports, where the center to center distance between said output ports is greater than approximately 125 $\mu$m.

9. The method of claim 1, where said optical waveguide device further comprises:

a plurality of output ports, where the center to center distance between said output ports is in the range of approximately 125 to 1000 $\mu$m.

10. The method of claim 1, where the center to center distance between the input port and output port which are closest to each other is greater than approximately 125 $\mu$m.

11. The method of claim 1, where the center to center distance between the input port and output port which are closest to each other is in the range of approximately 125 to 1000 $\mu$m.

12. The method of claim 1, where said optical waveguide device comprises a substrate made of $LiNbO_3$, silicon, $Si_3N_4$, silica glass or a Group III-IV semiconductor.

13. The method of claim 1, where said first arc portion has a radius of curvature greater than 100 $\mu$m.

14. The method of claim 13, where said first arc portion has a value of the radius of curvature which is the same as that of said second arc portion.

15. The method of claim 13, where said first arc portion has a value of the radius of curvature which is different from that of said second arc portion.

16. An optical pigtailing device, comprising:

an optical waveguide device comprising:

a substrate having a lateral surface and a top surface;

an optical waveguide formed on said top surface, whose shape comprises:

an input port terminating at said lateral surface;

a crosswise portion extending from said input port perpendicular to said lateral surface;

an arc portion extending from said crosswise portion;

a first lengthwise portion extending from said arc portion and running parallel to said lateral surface;

a branch splitting said first lengthwise portion;

a plurality of second lengthwise portions extending from the branch and running parallel to said lateral surface;

a second arc portion extending from one of the second lengthwise portions; and a second crosswise portion extending from said second arc portion perpendicular to said lateral surface, and terminating at an output port on said lateral surface; and an optical fiber array module, comprising:

a connector surface aligned with the lateral surface of said optical waveguide device;

a plurality of optical fibers terminating at said connector surface, where the terminating fibers on said connector surface are arranged to align with said input and output ports of said lateral surface of said optical waveguide device.

17. The device of claim 16, further comprising:

said second lengthwise portions being spaced from each other with a center-to-center distance in the range of approximately 5 to 1000 $\mu$m.

18. The device of claim 16, further comprising:

a plurality of second arc regions, each extending from one of said lengthwise portions and each terminating at a separate output port on said lateral surface.

* * * * *